(12) United States Patent  
Garnett et al.

(10) Patent No.: US 9,392,568 B2  
(45) Date of Patent: Jul. 12, 2016

(54) RADIO CHANNEL UTILIZATION

(71) Applicant: Microsoft Corporation, Redmond, WA (US)

(72) Inventors: Paul W. Garnett, Albany, NY (US); Amer A. Hassan, Kirkland, WA (US); Paul W. A. Mitchell, Seattle, WA (US); Jeffrey Z. Yan, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 14/079,391

(22) Filed: Nov. 13, 2013

(65) Prior Publication Data

US 2015/0133177 A1    May 14, 2015

(51) Int. Cl.
| | |
|---|---|
| *H04B 15/00* | (2006.01) |
| *H04W 64/00* | (2009.01) |
| *H04W 48/08* | (2009.01) |
| *H04W 4/02* | (2009.01) |
| *H04W 16/14* | (2009.01) |
| *H04W 72/04* | (2009.01) |
| *H04W 4/06* | (2009.01) |

(52) U.S. Cl.
CPC .............. *H04W 64/00* (2013.01); *H04W 4/02* (2013.01); *H04W 16/14* (2013.01); *H04W 48/08* (2013.01); *H04W 72/048* (2013.01); *H04W 4/06* (2013.01)

(58) Field of Classification Search
CPC ............................ H04W 64/00; H04W 28/16
See application file for complete search history.

(56) References Cited

U.S. PATENT DOCUMENTS

| | | | |
|---|---|---|---|
| 8,213,874 B2 | 7/2012 | Agnew | |
| 8,983,461 B1* | 3/2015 | Pandey | ................ H04W 48/16 455/434 |
| 2007/0091813 A1* | 4/2007 | Richard | ............. H04W 72/085 370/248 |
| 2010/0195667 A1 | 8/2010 | Wang | |
| 2012/0165059 A1 | 6/2012 | Gossain et al. | |
| 2013/0115984 A1* | 5/2013 | Schmidt | ................ H04W 16/14 455/501 |

FOREIGN PATENT DOCUMENTS

EP    2575387 A1    4/2013

OTHER PUBLICATIONS

International Search Report and Written Opinion, From PCT Patent Application No. PCT/US2014/064716, Mailed Apr. 17, 2015, 14 pages.

(Continued)

*Primary Examiner* — Edward Urban  
*Assistant Examiner* — Mohammed Rachedine  
(74) *Attorney, Agent, or Firm* — Steve Wight; Sandy Swain; Micky Minhas

(57) ABSTRACT

The concepts relate to radio channel utilization and more specifically to determining whether individual radio channels are available for use. One example can cause multiple sensing devices in a region to sense radio channels. The example can obtain signal information sensed by the multiple sensing devices in relation to an individual radio channel. The example can collectively analyze the signal information from the multiple sensing devices to determine whether the individual radio channel is being used for a licensed broadcast in the region.

20 Claims, 7 Drawing Sheets

(56) References Cited

OTHER PUBLICATIONS

Lavaux, D., et al., "COgnitive radio systems for efficient sharing of TV white spaces in EUropean context, COGEU D3.3, Final Architecture for TVWS Spectrum Sharing Systems," Nov. 2011, XP05518183, Retrieved on Apr. 9, 2015 from http://www.ict-cogeu.eu/pdf/COGEU_D3.3(ICT_248560).pdf, chapters 3.2, 4, 5.10, 6.1, 97 pages.

* cited by examiner

RADIO CHANNEL UTILIZATION

BACKGROUND

Ever increasing numbers of wireless devices are being introduced and sold. As such, the radio frequency (RF) spectrum available for these wireless devices to communicate continues to get more and more crowded. More efficient use of the RF spectrum and sharing under-utilized portions of the RF spectrum are very important to meet the growing number of wireless devices. One portion of the RF spectrum that is under-utilized is the portion reserved/licensed for broadcasting, such as television (TV) or other radio broadcasting. Governmental regulators divided the TV portion or range (and/or other portions) into a plurality of channels. However, for any given geographic region many of the channels are not utilized for TV or radio broadcasting.

Unused channels or frequencies of the reserved TV portion of the RF spectrum can be referred to as TV white space. It is possible to utilize these TV white spaces for other uses. However, their use tends to be tightly regulated by governmental institutions (such as the Federal Communications Commission in the United States) to ensure that the other uses do not interfere with the regulated broadcast use.

SUMMARY

The described implementations relate to radio channel utilization and more specifically to determining whether individual radio channels are available for use. One example can cause multiple sensing devices in a region to sense radio channels. The example can obtain signal information sensed by the multiple sensing devices in relation to an individual radio channel. The example can collectively analyze the signal information from the multiple sensing devices to determine whether the individual radio channel is being used for a licensed broadcast in the region.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio channels/frequencies. Wireless communication is increasing over the RF spectrum. In this document the terms 'channel' and 'frequency' are used interchangeably. The present concepts can be applied to any radio channel, such as radio white space channels. One type of radio white space channel relates to the portion of the RF spectrum reserved for television (TV) broadcasting. As used herein a "TV white space channel" means a channel or channel range that was reserved for TV broadcasting, but which is not actually used for TV broadcasting in a particular geographic region. Similarly, "radio white space channel" means a channel or channel range that was reserved for TV broadcasting, for other radio broadcasting, or two-way radio communications, but which is not actually used in such manner in a particular geographic region (at least not at particular times). Stated another way, radio white space can refer to allocated but unused portions of the RF spectrum.

Often individual devices can have difficulty finding out whether specific radio channels can be utilized. The present concepts can gather information about radio channels at multiple locations. The information can be analyzed collectively to determine whether individual radio channels can be used at other nearby locations.

System Examples

Figure 1:
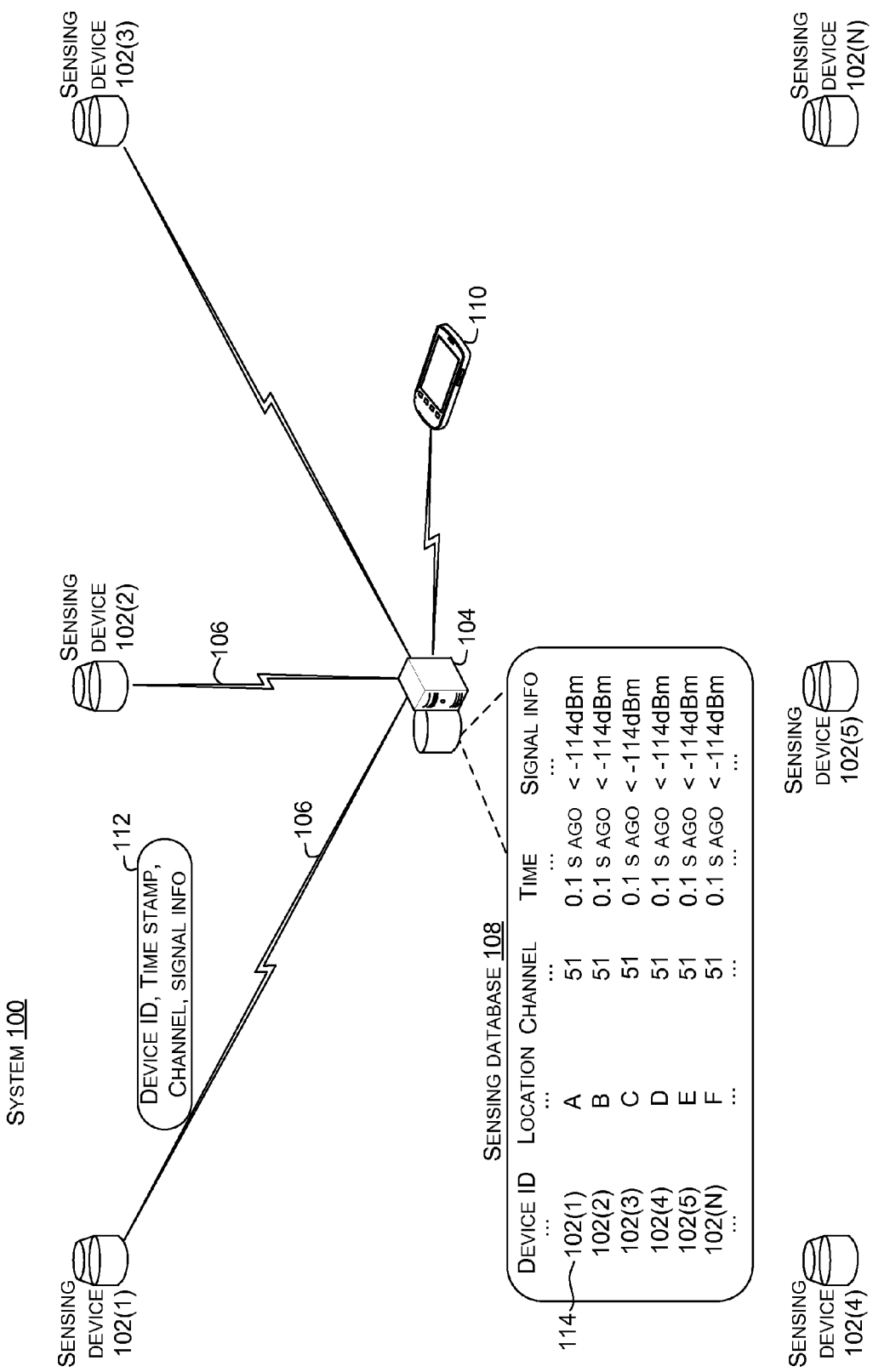
FIGS. 1-2 and 4-5 show examples of systems configured to utilize radio channels in accordance with some implementations of the present concepts.

For purposes of explanation consider introductory FIG. 1, which shows a radio channel usage scenario involving a system 100. This system includes multiple sensing devices 102 (1)-102(N). For ease of explanation, in this discussion the use of a designator with the suffix, such as "(1)", is intended to refer to a specific element instance relative to a specific element. In contrast, use of the designator without a suffix is intended to be generic. Thus, a discussion of sensing device 102 is intended to be generic to all of the sensing devices 102(1)-102(N), whereas a discussion of sensing device 102 (1) is intended to be specific to that device.

The sensing devices 102 can communicate with a computing device 104 over a network as represented at 106. (Not all sensing devices are shown communicating with computing device 104 due to space constraints on the drawing page). Computing device 104 can include or be in communication with a sensing database 108.

System 100 can also include a wireless device 110, such as a smart phone, tablet, or router, among others, that wants to communicate over one or more radio channels, such as by functioning as a wireless access point. Information from sensing database 108 can be utilized to identify radio channels that are available to wireless device 110. (Alternatively, wireless device 110 could obtain information directly from sensing devices 102 rather than from the sensing database 108 to identify available radio channels for use).

Several configurations of sensing devices 102 can be employed in various implementations. For example, the sensing devices could be powered by the electrical grid and physically coupled (e.g., by a wired network) to the sensing database. Alternatively, the sensing devices could be solar powered and wirelessly communicate (e.g., via a wireless network) with the sensing database. Example sensing devices are described in more detail below relative to FIG. 3.

Sensing device 102 can sense radio channels for the presence of signals. The sensing can relate to any radio channels, but specific examples are described below where the radio channels are radio white space channels. Sensing can be performed on individual radio channels or across multiple channels or channel ranges (e.g., cognitive radio). The sensing devices can then communicate the sensing results to the sensing database 108. In some configurations, the sensing database may access a regulatory database (illustrated relative to FIG. 2) that covers a region where the sensing devices are located. The regulatory database could provide a set of radio white space channels for that region. The sensing database could then cause the sensing devices to sense only the radio white space channels of the set (e.g., a reduced number of channels). Furthermore, in a situation where a device is in proximity of several bordering countries, the sensing database may access multiple regulatory databases where available. For example, the sensing database could access a regulatory database from each country (or at least some of the countries).

In some cases, the sensing devices 102 can send digitized signal information relating to the sensing to the sensing database 108. Examples of digitized signal information are described below relative to FIG. 3. Briefly, the digitized signal information can include gross signal strength, and/or other signal information, such as a phase or other features of the signal and/or a determination whether a licensed signal has been sensed on the radio channel.

In the illustrated configuration, the sensing devices 102 can sense one or more radio channels and communicate sensed signal information (e.g., sensing information) 112 to the sensing database 108. In this case, the sensing information 112 can include a device identification (ID), time stamp, sensed radio channel, and sensed signal information. (In this case, the sensing device's location can be known to the sensing database either because the sensing devices are at fixed locations or because location information is sent to the sensing database whenever the sensing device moves (or is moved)). For instance, horizontal row 114 of the sensing database indicates that device 102(1) is at (hypothetical) location A. This row further indicates that sensing device 102(1) sensed (hypothetical) radio channel 51 at a time 0.1 seconds ago and reported gross signal strength of less than −114 dBm.

In other configurations, the sensing information 112 can include location information of the sensing device 102. In some cases, the sensing devices may be configured to sense specific radio channels at specific intervals. In other cases, the sensing database may direct the sensing devices to sense specific radio channels and/or specific intervals to perform the sensing. Further, different radio channels can be sensed at different rates. For instance, a radio channel that appears to have an authorized broadcast signal may be sensed less frequently than a radio white space channel that is being used by wireless device 110 (e.g., an unlicensed user).

The sensing database 108 can utilize sensing information 112 from multiple sensing devices 102 to determine the availability of the sensed radio channel. For instance, the sensing database can use the sensed information about radio white space channel 51 from sensing devices 102(1)-102(N) to determine whether radio white space channel 51 is available for use by wireless device 110. In the illustrated example, sensing database 108 indicates that the sensing devices 102 have each supplied signal information indicating that signal strength on channel 51 is below −114 dBm. A signal strength measurement at a specific location can be inaccurate (e.g., false positives and/or false negatives). However, evaluation of measurements from multiple locations tends to provide a high degree of reliability (few false positives and/or false negatives).

In this example, wireless device 110 is at a location between sensing devices 102(2), 102(3), 102(5), and 102(N)). Thus, sensing database 108 can collectively evaluate the sensing data from these sensing devices relative to radio white space channel 51 to determine whether channel 51 is available for use by the wireless device. Alternatively or additionally, wireless device 110 can sense radio white space channel 51 to provide another sensing source that can be collectively analyzed. In an alternative configuration, wireless device 110 could receive the results from the sensing database and based upon the results, sense radio white space channel 51 to verify the results prior to using the radio channel.

In system 100, the sensing devices 102 are arranged relatively uniformly in a grid pattern. However, in various implementations, the sensing devices can be arranged in any manner that provides useful information. For instance, sensing devices may be placed around a high use area where additional wireless bandwidth is desired. In other cases, sensing devices may be positioned along travel routes, such as freeways or rail lines. In still other cases, sensing devices can be positioned proximate to border regions. One such example is described below relative to FIG. 2. In still other cases, sensing devices may be positioned around a geographic feature such as a hill that may make sensing from a single location particularly unreliable. For instance a TV tower could be positioned to the north of a hill. Sensing from a single location to the south of the hill may not detect the TV signal. However, a set of sensing devices positioned around the hill can collectively provide accurate detection of the TV signal (and thus allow a correct determination to be made that the radio channel is unavailable for use).

Sensing devices 102 can be freestanding, or can be integrated with other devices. Sensing devices could be positioned on buildings or utility poles, along harbors, proximate to borders, or any other locations that can provide useful information.

Figure 2:
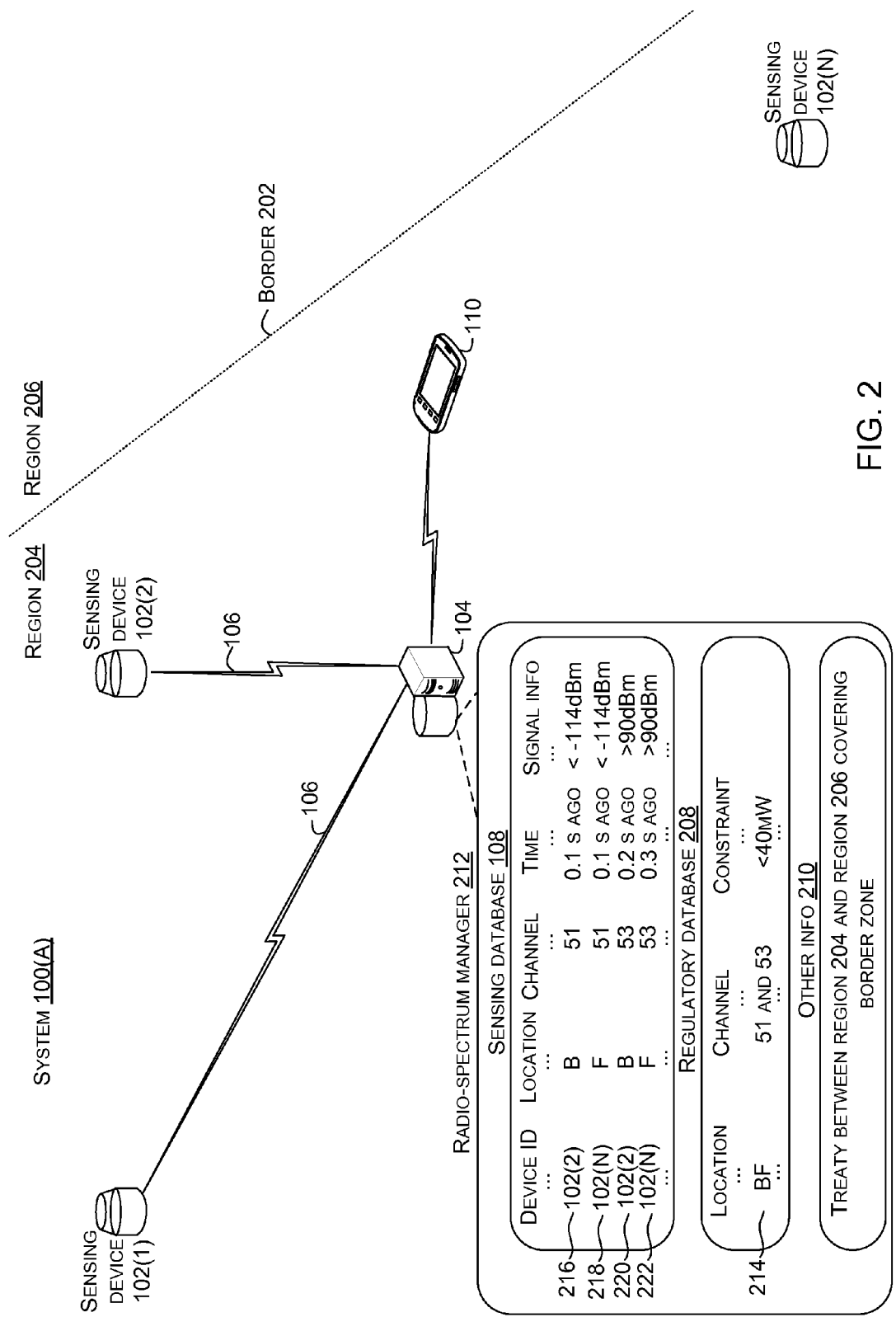

FIG. 2 shows a variation of system 100 described above relative to FIG. 1. For ease of explanation, this variation is designated as system 100(A). The system 100(A) carries over many of the components from system 100. However, some of the sensing devices 102 are omitted for ease of explanation and due to space constraints on the drawing page.

System 100(A) includes three additional inventive aspects. The first inventive aspect involves using the sensing devices 102 proximate to a border 202 that defines a region 204 from another region 206. The second inventive aspect involves utilizing sensing database 108 in combination with other sources of radio channel information. In this example, the other sources are manifest as a regulatory database 208 that relates to region 204 and other information 210. In this case, the other information relates to a treaty that covers border 202 between regions 204 and 206. In this case the (hypothetical) treaty indicates that use of channel 51 in region 204 within a border zone (e.g., within 30 miles of border 202) must not interfere with authorized use of channel 51 in region 206, and use of channel 53 in region 206 within the border zone must not interfere with authorized use of channel 53 in region 204.

The third inventive aspect can relate to a radio-spectrum manager 212. The radio-spectrum manager can process radio channel information from multiple sources, such as the sensing database 108, regulatory database 208, and/or other information 210.

In this example, assume that device 110 is at hypothetical location BF in region 204. Regulatory database 208 indicates on row 214 that radio white space channels 51 and 53 are available for use at location BF (from the perspective of region 204). However, assume that the treaty information indicates that use of channel 53 in region 204 (including location BF) cannot interfere with authorized use of channel 53 in region 206.

In this case, radio-spectrum manager 212 can cause sensing devices 102(2) and 102(N) to sense both channel 51 and channel 53. Row 216 of the sensing database 108 indicates that sensing device 102(2) sensed channel 51 0.1 seconds ago and the sensed signal was less than −114 dBm. Similarly, row 218 indicates that sensing device 102(N) also sensed channel 51 0.1 seconds ago and the sensed signal was less than −114 dBm.

The radio-spectrum manager 212 can collectively analyze the sensed information from sensing devices 102(2) and 102(N) and determine with a high degree of reliability that channel 51 is not being used for licensed broadcasting either in region 204 or region 206. Further, the treaty information indicates that channel 51 is authorized for use in region 204 and not in region 206. As such, channel 51 can be used by wireless device 110 in accordance with the constraints contained in the regulatory database 208 (e.g., the use is limited to less than 40 mW). In some cases, radio-spectrum manager 212 can make the determination that channel 51 is available for use by wireless device 110. In other cases, wireless device 110 may make the determination utilizing the described information in the databases 108, 208, and/or other information 210.

From one perspective, the collective analysis of sensed information from multiple sensing devices 102 can be thought of as distributed energy sensing. Where the sensing devices provide energy and phase information, the collectively analyzing can be thought of as employing MIMO (multiple-input multiple-output) disambiguation of the sensed channels.

In contrast to channel 51, relative to channel 53 information in sensing database 108 indicates at row 220 that sensing device 102(2) sensed a strong signal (e.g., greater than 90 dBm). Similarly, row 222 indicates that sensing device 102(N) sensed a strong signal (e.g., greater than 90 dBm) on channel 53. The radio-spectrum manager 212 can collectively analyze this information about channel 53. Information from multiple sources, especially multiple spaced-apart sources can allow a determination to be made about channel 53 that has a high degree of reliability. In this case, the sensed information collectively indicates, with a high degree of reliability, licensed use of channel 53. As such, channel 53 is likely unavailable for use by wireless device 110.

System 100(A) also lends itself to other border scenarios. For instance, rather than having other information 210 relating to the treaty, assume that little or no information is known about channel usage in region 206. For instance, no information may be known about whether channels 51 and 53 are authorized for use in region 206. For example, region 206 may not share information on TV tower locations. Alternatively, it could be known that channel 53 is authorized for use somewhere in region 206, but not whether channel 53 is authorized for use near border 202. In either of these cases, sensing devices, such as sensing devices 102(2) and 102(N) can sense for the radio channels. This sensed information can be analyzed collectively to protect authorized use in either region. Stated another way, the analyzing can determine whether individual radio channels can be used by wireless device 110 without interfering with authorized use in either region 204 or region 206.

The following discussion provides an explanation of one border zone implementation. This example is driven by the wireless device 110. Examples are described above and below that are driven by the sensing database 108 and/or the radio-spectrum manager 212. In this example, wireless device 110 may be configured to function as an access point (AP). The wireless device 110 can query the regulatory database 208 with its location (e.g., BF). Alternatively, the wireless device can query radio-spectrum manager 212 and the radio-spectrum manager can act on behalf of the wireless device. This latter version is described below where the radio-spectrum manager acts on behalf of the wireless device after the initial query. However, as noted in the former version, the wireless device could perform the technique.

In this example, the radio-spectrum manager 212 can query the regulatory database 208 with the wireless device's location BF. The radio-spectrum manager can also examine the other information 210 to determine if the location is covered (in this case by the treaty). The radio-spectrum manager can obtain a set of radio white space channels from the regulatory database 208. The radio-spectrum manager can then look for these channels in the sensing database proximate to location BF. If information is not already available in the sensing database, the radio-spectrum manager can cause some or all of the sensing devices 102 to sense some or all of the channels of the set.

The sensing can provide information about use of individual channels in region 204 and/or region 206. This sensed information about channel usage in region 206 can be especially valuable when region 206 does not otherwise provide information about its usage or the information is incomplete or inaccurate. At this point, the radio-spectrum manager 212 can collectively analyze sensed information from the sensing devices 102 about individual channels to make a final determination about availability for use. This information can then be provided to the wireless device 110. The wireless device can sense and verify that individual channels are available before commencing use.

Alternatively or additionally to utilizing dedicated sensing devices 102, the radio-spectrum manager 212 can coordinate a crowd-sourcing approach utilizing wireless devices in a region. For instance, FIG. 2 only illustrates one wireless device 110 in region 204. However, in some cases, there could be tens or hundreds or more wireless devices in the region. The radio-spectrum manager could determine the set of channels that are potentially available by querying the regulatory database 208 and the other information 210. The radio-spectrum manager 212 could cause the wireless devices to sense individual channels of the set and report their results in a similar manner to the techniques described for the sensing devices. This sensing information could provide more accurate identification of available radio channels than can be achieved with a single sensing device.

In some configurations, the radio-spectrum manager 212 can control sensing frequencies of various radio channels by the sensing devices 102. For instance, radio channels identified by the regulatory database 208 as white space channels can be sensed more than other radio channels. Further, after an initial sensing is performed and collective analysis is performed on the channels, those channels that are determined to have licensed use can be sensed less frequently than those that are available for use. Further still, individual available channels that are actually used by wireless device 110 can be sensed even more frequently to avoid a situation where licensed use starts on the channel and use by the wireless device interferes with the licensed use.

Another approach is for the sensing database 108 to be a simple entry by a regulatory entity. From one perspective, this can be thought of as a hardwired approach.

Note further, that while not illustrated in FIG. 2 due to space constraints, the radio-spectrum manager 212 and/or the sensing database 108 can track signal contributions of individual devices on an individual channel. In a simplified example, assume that wireless device 110 starts to use channel 51. Further, assume that the next signal samplings of channel 51 rise from less than −114 dBm to −100 dBm. The radio-spectrum manager 212 and/or the sensing database 108 can attribute that change in sensed signal strength to the use by wireless device 110.

In a more sophisticated example, the sensing devices 102 can sense additional signal information, such as phase and/or profile. The radio-spectrum manager 212 and/or the sensing database 108 can attribute aspects of the profile to an individual source. For example, television broadcasts can have a particular profile based upon their power and phase (e.g., expected profile). Similarly, authorized wireless microphone broadcasts/transmissions can have a particular profile based upon their power and phase.

In this case, when the wireless device 110 started using channel 51, the radio-spectrum manager 212 and/or the sensing database 108 could attribute both a power change and a profile change in subsequent sensed signals to the use by the wireless device. The attribution can also consider the distance between the wireless device 110 and individual sensing devices 102. Toward this end, the radio-spectrum manager 212 can create a mapping of the sensing devices, the wireless devices, relative distances, and/or which channels are being used by which wireless devices.

The mapping can also include the signal type (e.g., profile) of the signal utilized by individual wireless devices and how the individual signals contribute to the overall signal sensed on a radio channel. For instance, wireless device 110 can use channel 51 for wireless communications, such as 802.11 compliant communications. In such a case, the wireless device 110 can include a beacon in its signal that identifies the wireless device. The beacon can be thought of as a feature that identifies the wireless device as the originator of this portion of the signal sensed on channel 51 by the sensing devices 102.

Figure 3:
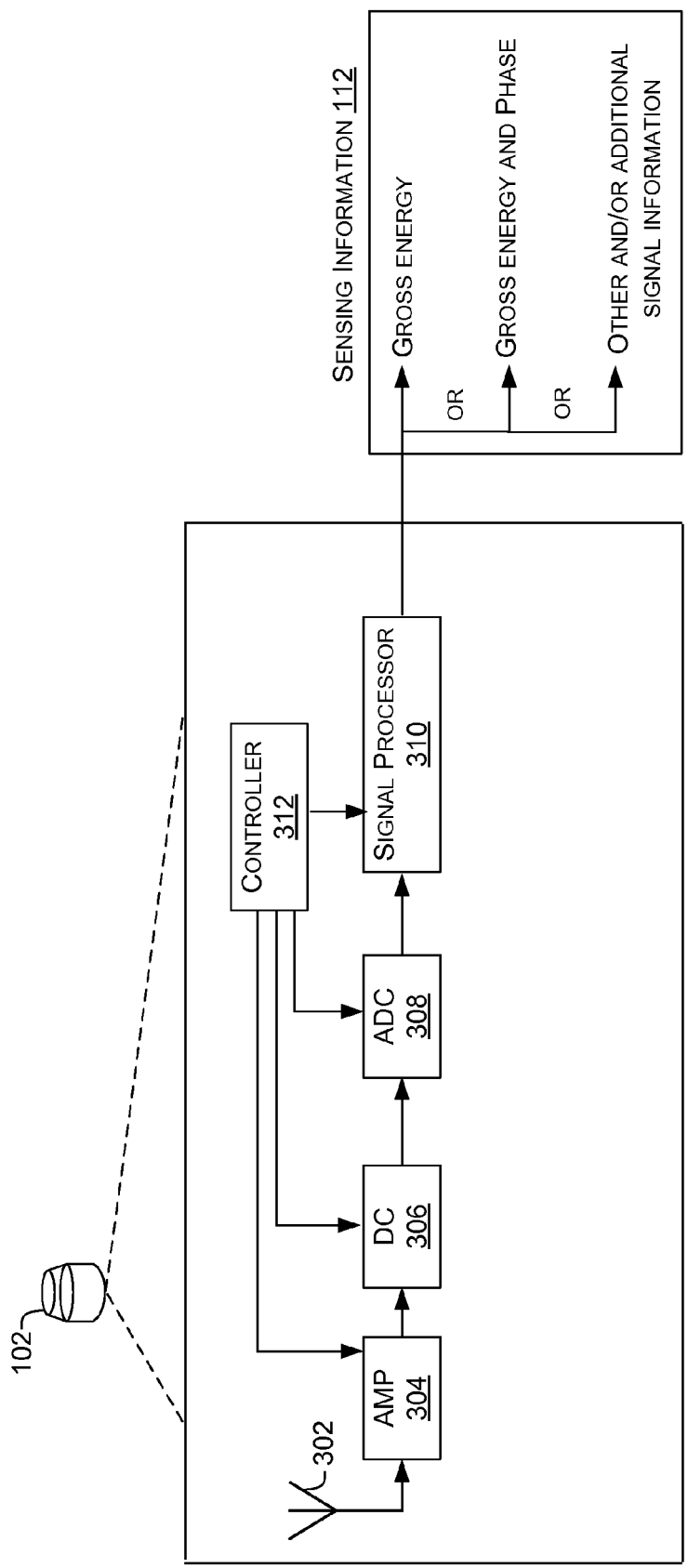
FIG. 3 shows an example of implementation details of a device introduced relative to the system of FIGS. 1-2.

FIG. 3 shows additional details relating to one implementation of sensing device 102. In this case, sensing device 102 can include an antenna 302, an amplifier 304, a down converter (DC) 306, an analog-to-digital converter (ADC) 308, a signal processor 310, and/or a controller 312.

In the illustrated configuration, the antenna 302 can sense an individual radio channel or set of channels. The radio channels that are sensed can be preset and/or specified by the controller 312 either acting in isolation or in cooperation with radio-spectrum manager 212 (FIG. 2), among others. Sensed analog signals from the antenna 302 can be delivered to the down converter 306 (with or without amplification by amplifier 304). The down converter can move the information bearing signal from high frequency to low frequency bands appropriate for processing. Output of the down converter can be delivered to the ADC 308. Other implementations may omit the down converter and send the analog signals directly to the ADC 308.

The ADC 308 can convert the analog signals to digital bits (e.g., digital signal) so that an amplitude of the analog signal at an instance in time is represented by a bit value. The bits can be thought of as a digitized representation of the sensed analog signal. Analog-to-digital conversion can be performed at different bit rates (e.g., digitized bit rate output). Higher bit rates can more precisely represent the signal than low bit rates. However, higher bit rate sampling tends to utilize more resources than lower bit rate sampling. In some cases, the ADC 308 can have a fixed bit rate, such as 4 bits. However, in other cases, the ADC can sample at a bit rate selected from a range of bit rates. For instance, the ADC can be configured to sample at rates of 1, 2, 3, 4, 5, 6, 8, 10, 12, and/or 16 bit per sample.

The sample rate can be selected based upon various conditions or parameters. For instance, if the sensing device 102 is connected to the AC power grid, the ADC bit rate may be automatically initiated at a relatively high rate, such as 12 or 16 bit. However, if the sensing device is running on limited power, such as a solar panel, the sensing device may start at a lower bit rate, such as 3 or 4 bits.

The digitized signal output by the ADC 308 can be supplied to the signal processor 310. The signal processor can configure the digitized signal for transmission depending on transmission capabilities of the sensing device and/or network bandwidth. For instance, the signal processor 310 may calculate a gross power for the sensed signal and transmit the gross power. Alternatively, the signal processor can calculate the gross power and phase of the sensed signal (e.g., signal profile). The signal processor can alternatively or additionally make a determination whether the sensed signal is an instance of a licensed signal. For instance, the signal processor can determine a likelihood that the sensed signal represents a licensed use. Techniques for making the determination are described below relative to FIG. 4. Relative to FIG. 4, the determination is performed by the radio-spectrum manager 212 (FIG. 2). However, the determination can also or alternatively be performed by sensing device 102, among others.

The signal processor 310 may associate the digitized signal and/or the determination with other signal related information, such as a time stamp, identification of the sensing device 102, etc. to generate the sensing information 112. As discussed relative to FIG. 1 above, the sensing information 112 can be sent to the sensing database 108.

The elements of sensing device 102 can be manifest on a general purpose device that includes some combination of software, firmware, and/or hardware that includes a multipurpose processor and/or storage. An alternative configuration can be manifest as a system on a chip design that may dedicate resources to the described elements.

Note that while specific sensor configurations are described in the above examples, the inventive concepts can be employed with many different sensor configurations. For instance, implementations can be configured with low end two-bit sensors. Other implementations can be configured with sensitive sixteen-bit sensors. Still other configurations can employ multiple types of sensors in a single implementation (e.g., a range of sensor capabilities in a single implementation). For example, one such implementation can employ some low end sensors in some sensing devices 102, such as the two-bit sensors, and some higher quality sensors, such as the above mentioned sixteen-bit sensors in other sensing devices 102. In another example, a system may include a range of different sensor types. For instance, the system could include some sensing devices with two-bit sensors, some sensing devices with four-bit sensors, some sensing devices with eight-bit sensors, and/or some sensing devices with sixteen-bit sensors, among others.

Figure 4:
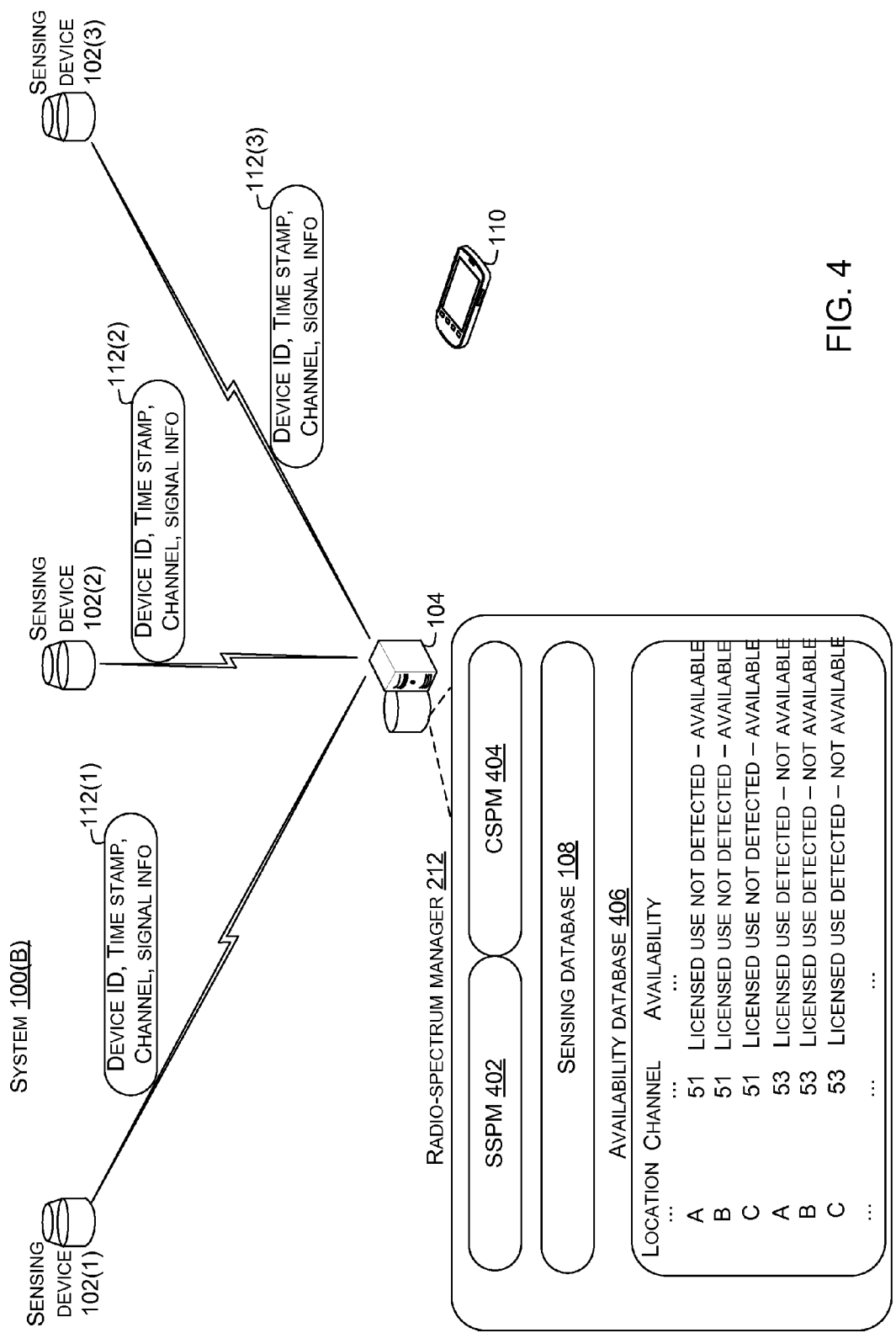

FIG. 4 shows details of another system 100(B) relating to one implementation of sensing database 108 and radio-spectrum manager 212. In this case, the radio-spectrum manager 212 includes a signal strength processing module (SSPM) 402 and a correlation signal processing module (CSPM) 404.

Assume for purposes of explanation, that the sensing database 108 is receiving sensing information 112(1), 112(2), and 112(3) from sensing devices 102(1), 102(2), and 102(3), respectively relating to radio channel 51. Digitized bits of the signal information can be received by the signal strength processing module 402. The signal strength processing module 402 can determine an average gross power of the digitized bits of sensing information 112(1), 112(2), and 112(3). In one case, the signal strength processing module can analyze the gross power of the digitized bits as a summation of the absolute value of the sensed signal r squared from the lower bound of 1 to the upper bound of n:

$$\Sigma_{i=1}^{n}|r_i|^2$$

The value of the summation can be repeated for each digitized signal as the summation of sensing information 112(1) (e.g., sensed signal) plus the summation of sensing information 112(2) plus the summation of sensing information 112(3). This value can then be divided by the number of signals (in this case three) to determine the average gross power.

The average gross power can be compared to a threshold energy level (e.g., threshold). In some implementations, the threshold energy level can be purposefully selected as a high value. For instance, the value of threshold energy level can be selected such that meeting or exceeding the threshold energy level creates a very high confidence that the sensed signal is a licensed signal. In one case, the threshold energy level can be selected such that equaling or exceeding the threshold energy level produces a 99% confidence that the sensed signal is an instance of a licensed signal.

The radio-spectrum manager 212 can use the comparison as conclusive evidence that the radio channel is being used by a licensed user. As such, the radio-spectrum manager 212 can avoid use of channel 51 for other uses proximate to sensing devices 102(1)-102(3). Instead the radio-spectrum manager can search for other channels to use. In the illustrated configuration, the radio-spectrum manager's determination regarding individual radio channels can be reflected in a channel availability database 406. The channel availability database 406 can indicate whether individual channels are available at individual locations, based upon the determination. The determination, in turn, can be based upon the average gross power measurement that includes the location and/or locations proximate to the location. Note further that the radio-spectrum manager can include other radio channel related information, such as information from regulatory database 208 (FIG. 2) and other information 210 (FIG. 2) in making the determination reflected in the availability database 406.

Alternatively or additionally to using average gross power to determine radio channel availability, the correlation signal processing module 404 can perform signal matching or pattern matching to the bits received from the sensing devices 102(1)-102(3) relating to radio channel 51. In this example, the correlation signal processing module 404 can include a copy of broadcast signal profiles. The copy can include listings of licensed use of individual channels or sets of channels. For instance, the listings could be specific to a geographic or regulatory region in which the sensing device 102 is located. For example, if the sensing device is in the US, the listings could be obtained from the advanced telecommunications systems committee (ATSC). In the UK, the listing can be provided by the broadcasting standards committee (BSC).

For a given region, the listings can include information about signals based upon use type. For instance, licensed signal 1 could relate to TV broadcast use and licensed signal 2 could relate to wireless microphone broadcast use. Any type of licensed use can be included, such as emergency channel broadcast use, air traffic channel broadcast use, military channel broadcast use, and/or GPS channel broadcast use, among others.

The correlation signal processing module 404 can determine an average profile of the bits from sensing devices 102(1)-102(3) relating to radio channel 51. In one configuration, the technique can be performed on the sensed signal from each sensing device individually and then the results can be averaged. Alternatively, the sensed signals from the various sensing devices can be averaged (or otherwise combined) and then the average signal can be compared to a known licensed signal.

The correlation signal processing module 404 can compare the average profile to individual licensed signals to determine a correlation or similarity between the average profile and the licensed use. Stated another way the correlation can indicate the probability that the average sensed signal is an instance of the licensed signal. A similarity threshold can be established, such that meeting or exceeding the similarity threshold is highly indicative that the sensed use represents a licensed use. In some implementations, correlation value (e.g., similarity) of a profile domain can be represented as:

$$\int_0^T r(t)s^x(t)dt$$

or in discrete time $$\sum_{i=1}^n r_i s_i^x$$

In this equation, s represents transmitted bits and x represents the conjugate. The conjugate serves to flip the phase of the signal in the bits. The correlation can be compared to the similarity threshold.

In some implementations, the similarity threshold can be set very high so that equaling or exceeding the similarity threshold is very indicative that the sensed signal is an instance of the licensed signal. In an instance where the similarity threshold is satisfied (e.g., the sensed signal conclusively matches the licensed signal), the channel can be treated as unusable and other channels can be investigated. In cases where the average sensed profile clearly does not match any licensed signal the radio channel can be considered to be available for use by non-licensed users, such as wireless device 110 that are proximate to the sensing devices.

In still another configuration introduced above relative to FIG. 3, the sensing devices can each analyze their own sensed signal to make a determination about the signal. The determination can then be sent to the radio-spectrum manager 212 which then collectively analyzes the individual determinations in a MIMO fashion to make a final determination.

In some configurations, even when a suitable channel is conclusively identified by the radio-spectrum manager 212, the radio-spectrum manager can cause the sensing devices 102 to resample the signal on the channel. The newly sampled signals can be analyzed by the signal strength processing module 402 and the correlation signal processing module 404 as described above. The radio-spectrum manager 212 may cause the resampling to be performed periodically and/or when one or more conditions or parameters changes. For instance, the radio-spectrum manager could cause the resampling to occur every minute during use of the channel by the wireless device 110. Alternatively or additionally, the radio-spectrum manager can cause the resampling to be performed periodically, from time to time, and/or when conditions change.

Note that in an alternative configuration, the sensing devices 102 can perform the gross power analysis and/or gross power and phase analysis described above. The sensing devices can then make a determination whether the sensed signal is a licensed signal. The sensing devices can then send their decisions to the radio-spectrum manager 212. The decisions can be conveyed in various ways, such as in the form of a likelihood ratio. The radio-spectrum manager can collectively analyze the decisions from multiple sensing devices to make a final determination relative to a specific location, such as a location of the wireless device 110.

From one perspective, some implementations can be thought of as involving multi-resolution, variable window sensing. The multi-resolution, variable window sensing can involve geometric increase with linearly reduced noise floor up to a maximum window size. In one configuration, sensing is performed over a time window. However, efficient sensing varies the time windows depending on the decision on whether a radio channel is confirmed available for use (as white space) or busy. If the channel is deemed busy by a TV channel, the sensing periodicity is doubled until it reaches a maximum period (for a busy state this can be multiple minutes).

Figure 5:
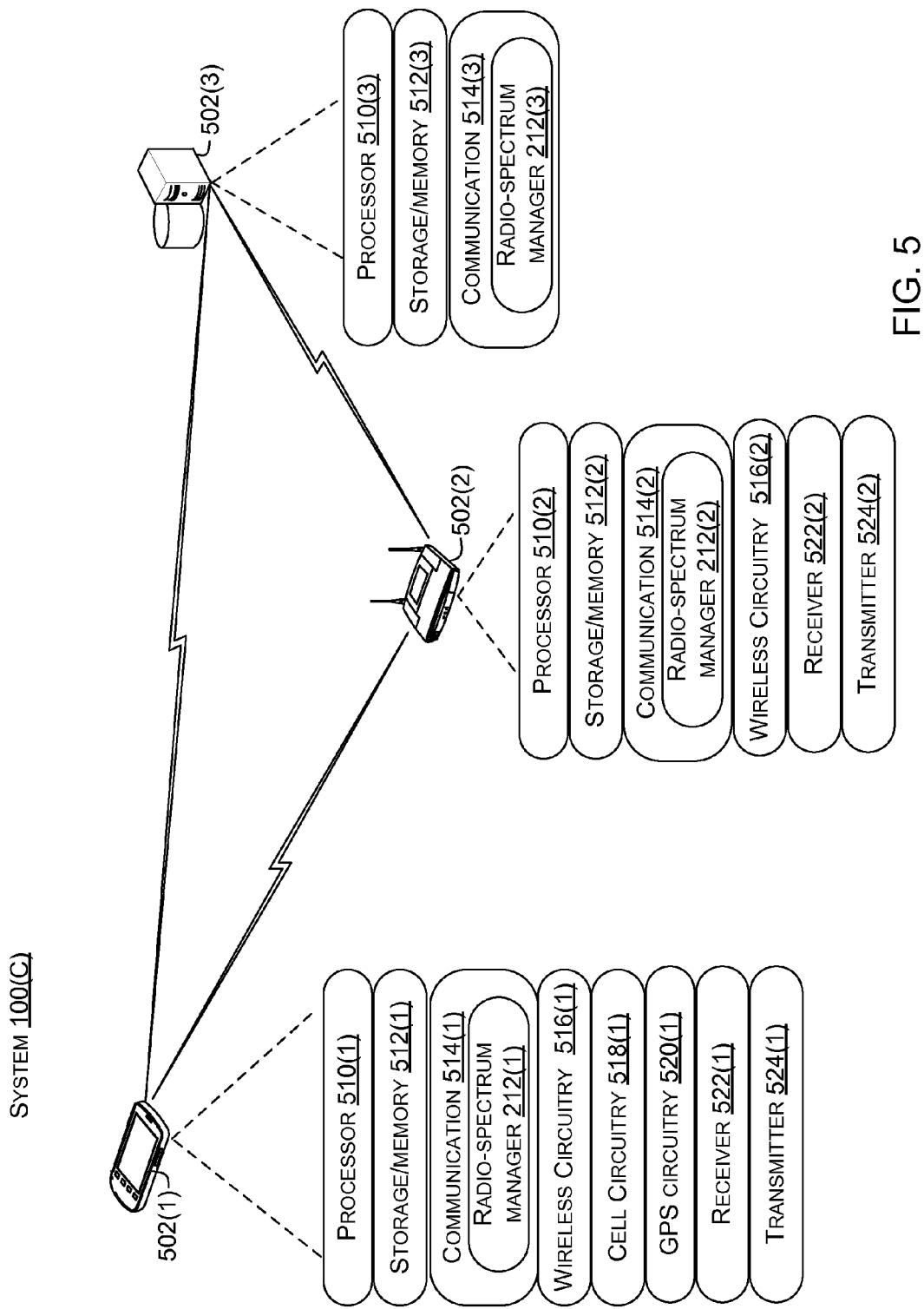

FIG. 5 provides another system 100(C) that includes further details regarding elements introduced in the discussion above. System 100(C) can include multiple devices. In the illustrated configuration, a first device is manifest as a mobile wireless device 502(1), such as a smart phone, tablet, etc. A second device is manifest as a wireless router 502(2). The third device is a computer 502(3), such as a server computer that may be manifest at a defined location or as cloud-based resources. Devices 502(1) and 502(2) can be thought of as examples of wireless devices, such as wireless device 110 described above relative to FIGS. 1-2 and 4. Device 502(3) can be similar to computing device 104 described above relative to FIGS. 1-2 and 4.

In some configurations, the devices 502(1)-502(3) can include a processor 510, storage/memory 512, a communication manager or component 514, wireless circuitry 516, cell circuitry 518, GPS circuitry 520, a receiver 522, and/or a transmitter 524. Not all of these elements need occur on each device 502. Individual devices 502 can alternatively or additionally include other elements, such as input/output devices (e.g., touch, voice, and/or gesture), buses, displays, graphics cards, etc., which are not illustrated or discussed here for sake of brevity. Of course, not all device implementations can be illustrated and other device implementations should be apparent to the skilled artisan from the description above and below.

The term "device", "computer", or "computing device" as used herein can mean any type of device that has some amount of processing capability and/or storage capability. Processing capability can be provided by one or more processors (such as processor 510) that can execute data in the form of computer-readable instructions to provide a functionality. Data, such as computer-readable instructions, can be stored on storage, such as storage/memory 512 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as servers, personal computers, desktop computers, notebook computers, cell phones, smart phones, personal digital assistants, pad type computers, mobile devices, wireless devices, cameras, routers, or any of a myriad of ever-evolving or yet to be developed types of computing devices. A mobile computer or mobile device can be any type of computing device that is readily transported by a user and may have a self-contained power source (e.g., battery). Similarly, a wireless device can be any type of computing device that has some capability to communicate with other devices without being physically connected to them. In some cases, a wireless device may have both wireless and wired capabilities. For instance, a router can be physically connected to a network, such as with an Ethernet cable, and wirelessly communicate with devices over radio channels, such as radio white space channels and/or Wi-Fi channels, among others.

In the illustrated implementation, devices 502(1)-502(3) are configured with a general purpose processor 510 and storage/memory 512. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

The communication manager 514 can include the radio-spectrum manager 212 described above relative to FIGS. 2 and 4. The communication manager 514 can manage which communication mechanisms are utilized in a specific scenario. For instance, the communication manager can determine that some data communications can occur over a cellular mechanism while other data communications can occur over a Wi-Fi compliant mechanism. The radio-spectrum manager 212 can identify radio channels that can be utilized by the communication manager.

Wireless circuitry 516 can facilitate communication over various radio channels, such as radio white space channels, Wi-Fi™ channels, Bluetooth™ channels, etc. The cell circuitry 518 can be thought of as a subset of the wireless circuitry relating to cellular channels. The cellular circuitry can handle communications over cell data channels and cell control channels. The GPS circuitry 520 can utilize GPS satellite signals to calculate the device's location.

The receiver 522 and the transmitter 524 can function to transmit and receive data on various channels. For example, the receiver 522 and the transmitter 524 can be configured to operate at specific channels, such as channels in the 2.4 GHz ISM band, or 5 GHz UNII and ISM bands, 60 GHz, and/or TV channels in the VHF and UHF bands (50 MHz to 810 MHz), among others. Alternatively, the transmitters and receivers can be configured to tune to any channels in the RF spectrum. Transmitter 524 can be configured to transmit at a specific power or a range of powers. For instance, the transmitter can be configured to transmit at 1 mW or a range of powers from 1 mW to 100 mW. The transmitter can have different power limits for different channels. For instance, a Bluetooth transmission power limit may be lower than a TV WS power limit.

While discrete components or elements are illustrated, some implementations may combine elements. For instance, wireless circuitry 516 may include dedicated receivers and transmitters rather than interfacing with distinct receivers 522 and transmitters 524. The wireless circuitry 516, cell circuitry 518, GPS circuitry 520, receiver 522, and/or the transmitter 524 can be hardware based or a combination of hardware and software. The circuitry may utilize a system on a chip (SOC) configuration (described above).

Note that while not specifically described, any of devices 502(1)-502(3) could include the elements described in relation to FIG. 3 for sensing radio channels.

The communication manager 514 can cause the receiver 522 to tune to specific radio channels and sense for signals. The communication manager can also obtain information about licensed signals for the individual channels or groups of channels. For example, in a geographic area, such as the United States or Great Britain, the television broadcast signals may have similar profiles. In such a case, the communication manager can utilize information about a 'generic' TV broadcast signal when evaluating a sensed signal from an individual radio channel in the TV range.

In some configurations an individual device, such as device 502(1) may operate autonomously or semi-autonomously to manage in communications. As mentioned above, the sensing database 108 (FIGS. 1-2 and 4) may be stored on the individual device 502(1), such as on storage/memory 512(1). For instance, device 502(1) could be moved by a user to a new location. The device 502(1) may want to communicate on a radio white space channel. The device could receive signal information from sensing devices 102 (FIGS. 1-4) to identify available radio channels at the location.

In an alternative configuration, device 502(3) could at least partially manage device 502(1) and/or other devices, such as device 502(2). For instance, radio-spectrum manager 212(3) of device 502(3) could evaluate channel related information (as discussed relative to FIGS. 2 and 4) based upon the location of device 502(1). The radio-spectrum manager 212(3) could communicate this information to communication manager 514(3). The communication manager 514(3) could also send instructions to communication manager 514(1) to utilize the identified channels for specific or general data communication. In some cases, device 502(3) might be associated with a service provider of the cellular services utilized on device 502(1). As such, communication manager 514(3) may instruct communication manager 514(1) to offload some data communication handled by cell circuitry 518(1) to the identified individual available radio channels.

Note that some implementations can utilize information about a device, such as location information. Any such information gathering can be conducted in a manner that protects the security and privacy of the user. The user can be given notice of the use and allowed to opt-in, opt-out, and/or define such use. In any event, the present implementations can be accomplished in a manner that utilizes the information in a very targeted manner that limits the use of the information to accomplishing the present radio channel utilization concepts.

Method Examples

Figure 6:
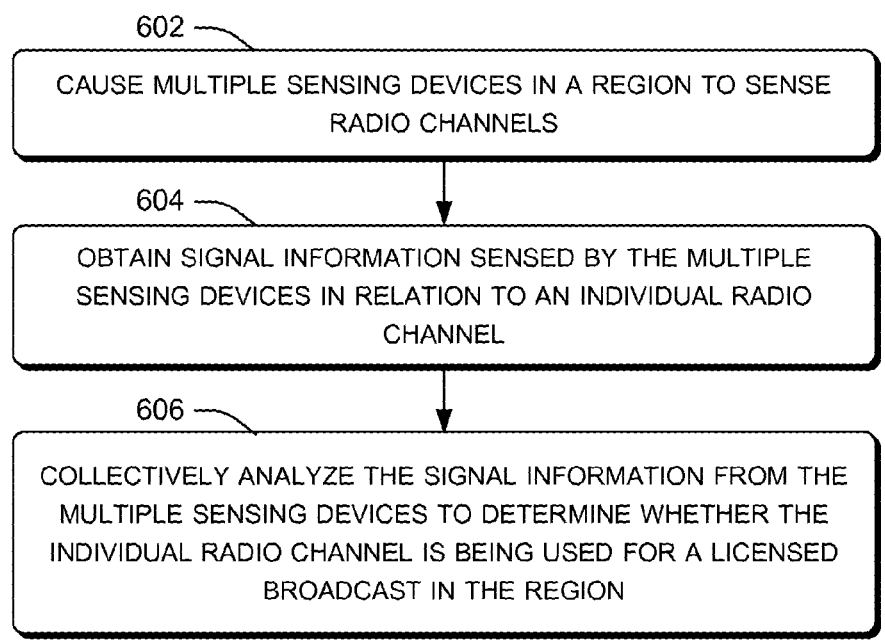
FIGS. 6-7 are flowcharts of examples of radio channel utilization techniques in accordance with some implementations of the present concepts.

FIG. 6 shows a method 600 for utilization of radio channels.

The method can cause multiple sensing devices in a region to sense radio channels at 602.

The method can obtain signal information sensed by the multiple sensing devices in relation to an individual radio channel at 604.

In some configurations, the method can also obtain other information relating to the region. For instance, other information can include information involving a border between the region and a second region. The border can be covered by various agreements, such as treaties. In some configurations, the other information can be obtained prior to the signal information sensed by the multiple sensing devices. In other cases, the other information can be obtained concurrently with the sensing or after the sensing.

The method can collectively analyze the signal information from the multiple sensing devices to determine whether the individual radio channel is being used for a licensed broadcast in the region at 606. In cases involving borders, the collectively analyzing can also determine whether the individual radio channel is being used for a licensed broadcast in the second region.

Figure 7:
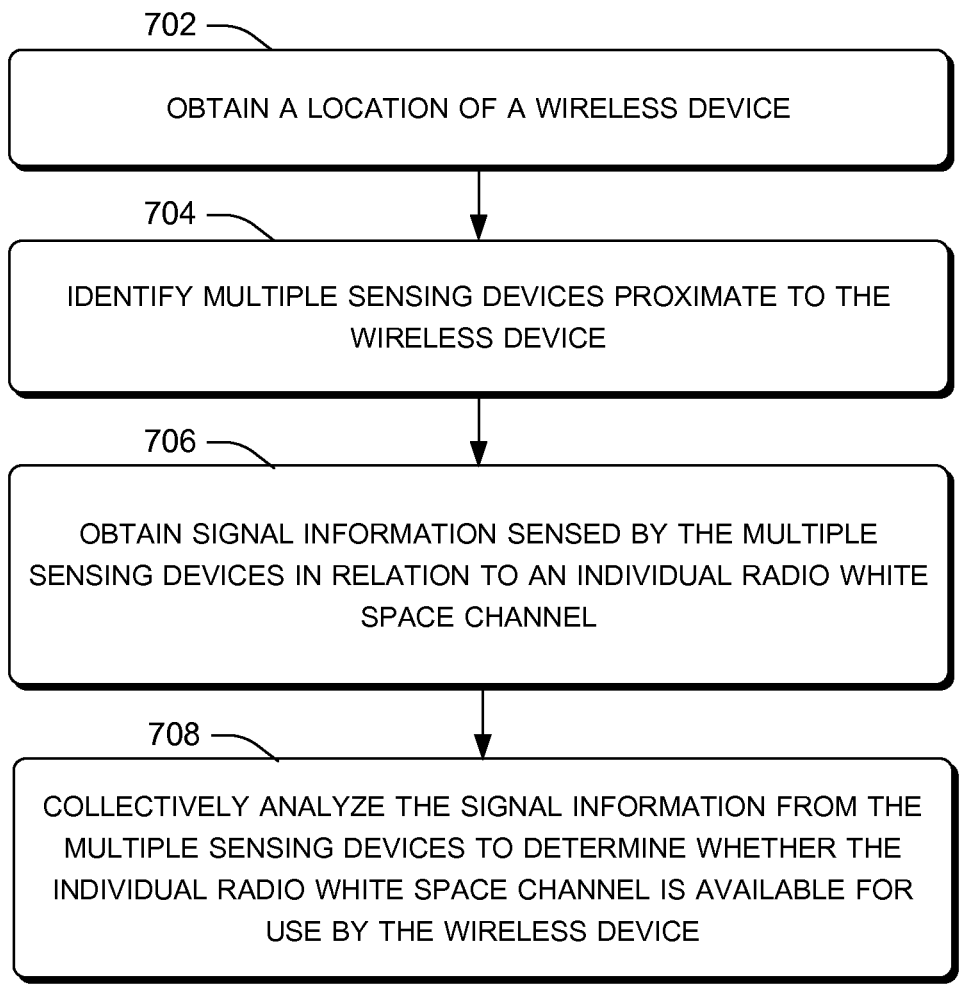

FIG. 7 shows a method 700 for utilization of radio channels.

The method can obtain a location of a wireless device at 702. The location can be a specific location, such as can be obtained via GPS, or a relative location, such as can be obtained via cell tower triangulation.

The method can identify multiple sensing devices proximate to the wireless device at 704. For instance, the location can be mapped to proximately located sensing devices in a database. For example, the database can be a regulatory (and/or other) database that covers locations of the multiple sensing devices and receives a set of radio white space channels that includes the individual radio white space channel.

The method can obtain signal information sensed by the multiple sensing devices in relation to an individual radio white space channel at 706. For example, the method can cause the multiple sensing devices to sense the individual radio white space channel after obtaining the location.

The method can collectively analyze the signal information from the multiple sensing devices to determine whether the individual radio white space channel is available for use by the wireless device at 708. In some cases, the sensing can be performed continuously or periodically. The rate of sensing can also be dependent on the results of the sensing. For instance, radio channels that are determined to be unavailable for use may be sensed less frequently than those that are available for use.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio channels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   obtaining a location of a wireless device;
   identifying multiple sensing devices proximate to the wireless device;
   obtaining signal information sensed by the multiple sensing devices in relation to an individual radio white space channel;
   collectively analyzing the signal information from the multiple sensing devices to determine whether the individual radio white space channel is available for use by the wireless device at the location, the collectively analyzing comprising gross power analysis and phase analysis of the signal information; and, in an instance where the collectively analyzing determines that the individual radio white space channel is available for use by the wireless device at the location, causing the multiple sensing devices to re-sense the individual radio white space channel more frequently than another instance where the collectively analyzing determines that the individual radio white space channel is not available for use by the wireless device at the location.

2. The method of claim 1, wherein the collectively analyzing is performed by the wireless device, performed by a service provider associated with the wireless device, or performed at least in part by the multiple sensing devices.

3. The method of claim 1, wherein the individual radio white space channel is not available for use by the wireless device when the collectively analyzing provides an indication that a licensed use is present in the signal information.

4. The method of claim 1, wherein the individual radio white space channel is one of multiple radio white space channels sensed by the multiple sensing devices and the collectively analyzing further comprises disambiguation of the multiple radio white space channels.

5. The method of claim 1, further comprising creating a mapping of the wireless device and the multiple sensing devices, wherein the mapping is utilized in the collectively analyzing.

6. The method of claim 1, wherein the obtaining signal information comprises causing the multiple sensing devices to sense the individual radio white space channel after the obtaining the location of the wireless device.

7. The method of claim 1, wherein the obtaining signal information comprises causing the multiple sensing devices to sense the individual radio white space channel continuously or periodically.

8. The method of claim 1, wherein the obtaining signal information comprises accessing a regulatory database that covers locations of the multiple sensing devices and receiving a set of radio white space channels that includes the individual radio white space channel.

9. The method of claim 8, wherein the obtaining signal information further comprises causing the multiple sensing devices to periodically or continuously sense the set of radio white space channels.

10. One or more computer-readable storage media storing computer-readable instructions that when executed by a processor of a computer cause the computer to perform a method, comprising:

causing multiple sensing devices in a region to sense radio channels;

obtaining signal power and phase information sensed by the multiple sensing devices in relation to an individual radio channel;

collectively analyzing the signal power and phase information from the multiple sensing devices to determine whether the individual radio channel is being used for a licensed broadcast in the region; and, in an instance where the collectively analyzing determines that the individual radio channel is available for use by a wireless device at the location, causing the multiple sensing devices to re-sense the individual radio channel more frequently than another instance where the collectively analyzing determines that the individual radio channel is not available for use by the wireless device at the location.

11. The one or more computer-readable storage media of claim 10, wherein the obtaining further comprises obtaining other information relating to the region, wherein the other information is obtained prior to the signal power and phase information.

12. The one or more computer-readable storage media of claim 10, wherein the radio channels comprise radio white space channels and further comprising accessing a regulatory database to obtain the radio white space channels that are available in the region.

13. The one or more computer-readable storage media of claim 10, wherein the region shares a border with another region and wherein the collectively analyzing also determines whether the individual radio channel is being used for another licensed broadcast in the another region.

14. A system, comprising:
a sensing database;
a radio-spectrum manager; and,
multiple sensing devices spaced apart from one another within a region, individual sensing devices including an antenna coupled to an analog-to-digital converter and a controller, the antenna configured to sense signals on radio channels, the controller configured to cause the sensed signals on the radio channels to be digitized by the analog-to-digital converter and the digitized signals to be communicated to the sensing database, wherein the sensing database is communicatively coupled to the multiple sensing devices and configured to map sensed power and phase information about individual sensed radio channels to locations of the individual sensing devices that performed the sensing and a time that the individual sensing devices performed the sensing, wherein the radio-spectrum manager is configured to utilize the mapped sensed power and phase information to identify a specific individual sensed radio channel that can be utilized by a wireless device at a location in the region, and wherein the radio-spectrum manager is further configured to cause at least one of the multiple sensing devices to re-sense the specific individual sensed radio channel at a greater frequency than another radio channel that is not available for use by the wireless device.

15. The system of claim 14, wherein the radio-spectrum manager is further configured to identify the specific individual sensed radio channel that can be utilized by the wireless device in response to a query by the wireless device, the query including the location of the wireless device.

16. The system of claim 14, wherein the radio-spectrum manager is further configured to access the sensing database and other databases relating to the radio channels and to control the sensing devices based upon information from the sensing database and the other databases.

17. The system of claim 14, wherein the radio-spectrum manager is further configured to collectively analyze digitized signals from the multiple sensing devices relating to a specific individual radio channel to determine how the specific individual radio channel is being utilized in the region.

18. The system of claim 14, wherein the radio-spectrum manager is further configured to collectively analyze subsequent digital signals from the multiple sensing devices to identify a portion of the subsequent digital signals contributed by the wireless device.

19. The system of claim 14, wherein the multiple sensing devices are identical or wherein the multiple sensing devices are different.

20. The system of claim 14, wherein a first individual sensing device has a first digitized signal bit rate output and a second individual sensing device has a second different digitized signal bit rate output.

* * * * *